(12) United States Patent
Doyle

(10) Patent No.: US 6,464,309 B2
(45) Date of Patent: Oct. 15, 2002

(54) LOW GROUND PRESSURE TIRE CHAINS FOR SKID-STEER LOADERS AND OTHER CONSTRUCTION MACHINERY

(76) Inventor: Richardson J. Doyle, 21661 Brookhurst Rd., Apt. #192, Huntington Beach, CA (US) 92646

( * ) Notice: Subject to any disclaimer, the term of this patent is extended or adjusted under 35 U.S.C. 154(b) by 0 days.

(21) Appl. No.: 09/747,319

(22) Filed: Dec. 22, 2000

(65) Prior Publication Data

US 2002/0079737 A1 Jun. 27, 2002

(51) Int. Cl.[7] .......................... A01B 33/00; B60B 15/00; B60S 1/62; B21L 3/00; B60C 11/00
(52) U.S. Cl. .......................... 305/187; 305/111; 305/201; 152/225 R
(58) Field of Search .................. 152/225 R, 226, 152/227, 228; 305/7, 19, 187 I, 188, 189, 191, 111, 200, 201, 160, 162, 161

(56) References Cited

U.S. PATENT DOCUMENTS

| | | | | | |
|---|---|---|---|---|---|
| 1,414,735 A | * | 5/1922 | Greenslade | ............... | 152/185.1 |
| 1,632,674 A | * | 6/1927 | Pearson | ............... | 305/187 |
| 1,780,513 A | * | 11/1930 | Arps | ............... | 152/228 |
| 2,917,095 A | * | 12/1959 | Galanot | ............... | 152/225 R |
| 2,973,995 A | * | 3/1961 | Weier | ............... | 152/228 |
| 3,133,767 A | * | 5/1964 | Wunsch | ............... | 305/189 |
| 4,408,646 A | * | 10/1983 | Forsyth | ............... | 152/179 |
| 4,605,264 A | * | 8/1986 | Tonsor | ............... | 305/188 |
| 5,284,387 A | * | 2/1994 | Loegering | ............... | 305/193 |
| 5,951,124 A | * | 9/1999 | Hoffart | ............... | 305/111 |
| 5,988,776 A | * | 11/1999 | Zurn | ............... | 305/111 |
| 6,299,265 B1 | * | 10/2001 | Hoffart | ............... | 152/225 R |

* cited by examiner

*Primary Examiner*—S. Joseph Morano
*Assistant Examiner*—Jason R. Bellinger
(74) *Attorney, Agent, or Firm*—Trojan Law Office (57) ABSTRACT

A track (12) for small loaders (10) having spaced-apart pairs of wheels (14, 16) assembled with a plurality of base units (24) pivotally interconnected in series by opposing links (26), each base unit comprising a pair of opposing side supports (32) with a wedge portion (36) extending towards the opposing side support to wedgingly receive a portion of a tire in a gap between the opposing side supports. A pair of spaced-apart transverse cross members (34) extend between the side supports and define cavities (50) between a leading edge and the wedge portion for receiving fasteners to secure a bottom plate (52) to the base unit. The assembled track mounts around the tires of the loader to provide traction and floatation of the loader during operation in mud or sand.

38 Claims, 6 Drawing Sheets

LOW GROUND PRESSURE TIRE CHAINS FOR SKID-STEER LOADERS AND OTHER CONSTRUCTION MACHINERY

TECHNICAL FIELD

This invention relates to tire chains. More particularly, the present invention relates to tire chains used on compact front-end loaders and other similar construction machinery to improve floatation, traction, and handling during operation.

BACKGROUND OF THE INVENTION

For many years cars, trucks, and other tire mounted vehicles have used tire chains to improve operational control over soft or slippery road surfaces.

A. Skid Steer Loaders

More recently, construction machinery owners have attempted to use tire chains on tire mounted construction machines. This is especially true for compact front-end loaders, which will be referred to as skid steers. Skid steers are powerful compact loaders used to dig, haul, or lift earth and other materials. The main components of skid steer loaders include an operator's cab, a diesel or gasoline engine, hydraulic pumps, hydrostatic transmission, a pair of lift arms, a bucket operatively attached at the distal ends of the lift arms, and two pairs of opposing tires. Many other construction machines and vehicles are composed of similar components. What separates the skid steer from its counterpart construction machinery is its unique steering system.

B. Steering Systems

Front-wheel steering is a popular directional steering system used on tire-mounted vehicles such as cars and trucks. A car usually steers or turns by changing the direction of the front tires. Turning occurs because while being in motion the centerline of the front tires is no longer parallel or in line with the centerline of the rear tires. Similar concepts, e.g. rear-wheel and all-wheel steering, can be seen in typical forklifts.

Many tire-mounted construction machines use articulated directional steering. Articulated steering works because the vehicles are designed in two separate independent sections. The two sections are connected at a pivotal point. Whenever the two sections pivot and their centerlines point in different (unparallel) directions, the vehicle turns. Articulated steering can be seen in most front-end loaders over 10,000 pounds.

C. Steering System For Skid Steer Loaders

The skid steer loaders use a directional steering system. In skid steers, the centerlines of the front and rear tires remain parallel and in line with each other at all times. This kind of steering system can be also seen in excavators, bulldozers and tanks, and is one of the very few steering systems that allow the vehicle to turn 360 degrees without moving forward or backward.

The directional steering capabilities of a skid steer arises from the independent pairs of left and right side drive systems. Tire-mounted skid steers have four axles, two per side of the machine. The two axles per side are spaced typically 3 feet to 4 feet apart on the same lateral axis and evenly protruding from the machine body. Identical wheels and tires are mounted on each of the axles. A key factor for the turning capabilities of skid steer loaders is that the left and right pair of opposing tires are powered by independent drive systems. As a result, when the left and right pair of opposing tires are moving forward at the same speed, then the machine moves straight forward. However, if the left pair of tires is moving forward at a different speed than the right pair of tires, then the loader will slide and turn. The machine turns in the direction of the side with the faster moving pair of tires. Moreover, if the left pair of tires is moving forward and the right pair of tires is moving backward, or vice versa, at the same speed, then the skid steer performs a 360-degree rotation without moving forward or backward. Since all four Skid steer tires remain parallel and in line to each other at all times, tire chains can be utilized more efficiently to improve floatation, traction and control.

D. Applying Tire Chains To Skid Steers

In the last decade, the skid steer has become a very popular machine in the construction industry. It has won recognition for being a versatile machine (for example, being the construction vehicle with a great variety of attachments), and a compact and maneuverable machine that can handle many types of construction jobs. However, occasionally the tires of the skid steer tend to slip, especially in snow, mud, sand, and other slippery or boggy conditions that are often found on job sites. The insufficient traction of the four skid steer tires under certain conditions results in unsatisfactory and often risky operation and performance. In an attempt to resolve this, tire chains have been applied to skid steers.

When cars or trucks use tire chains, each tire must use its own chain, the so-called "single-wheel" tire chain. Due to the unique steering system of the skid steer—all wheels remaining parallel and in line with each other at all times—a more advanced tire chain can be used. The skid steer "two-wheel" tire chain is wrapped around each pair of left and right side tires. The two-wheel tire chain is more efficient because more chain is making contact with the operating ground. The whole area between the two tires on each side of the machine (usually 3 to 4 feet) is used for additional traction and floatation. This feature of the skid steer two-wheel tire chain is in sharp contrast to the single-wheel tire chains, which utilize only the operating ground that is immediately under the tire. Depending on the spread of the wheelbases of the skid steer, the contact area between the operating ground and the two-wheel tire chain can be on average 5 to 10 times greater than that of the single-wheel tire chain.

E. Current Tire Chains For Skid Steer

Current tire chains made for skid steers attempt to solve the problem with traction insufficiency under slippery or boggy operating ground conditions. The main component of the current skid steer two-wheel tire chains is the "pad." The pad usually consists of a crossbar with two opposing sidewalls—one on each side of the crossbar. The sidewalls, which are set perpendicular to the connecting crossbar, create a valley or groove. When subsequent pads are connected together with links to comprise a chain, a continuous groove is formed for skid steer tires to ride within. The sidewalls of each pad keep the chain aligned with the tires and at the same time prevent the tires from derailing off the chain.

F. Drawbacks Of Current Two-Wheel Tire Chains For Skid Steers

Current two-wheel tire chains for skid steers generally work mechanically well. However, these tire chains provide poor enhancement to the traction of the loader machine in slippery or boggy conditions and offer little or no floatation. The term "floatation" refers to the wheels and chains of the loader remaining above the ground surface, rather than sinking into the ground during operation of the skid steer.

For the optimal performance of the skid steer, both problems of traction and floatation have to be resolved simultaneously. In addition to the traction and floatation problems, the current two-wheel tire chains for skid steers impose many other inconvenient restrictions that need consideration.

One drawback is that current skid steer two-wheel tire chains have a large open space between adjacent pads and between the two crossbars of each individual pad. The open spaces between adjacent pads and between the crossbars of the single pads limits both traction and floatation of the loader. For example, when operating the skid steer in mud, the open spaces within the chain allow the mud to pass upwards. This causes the machine to sink, and creates extreme operating stresses for the drive motors. Indeed, skid steers using the current two-wheel tire chains in mud have to deal with a greater drive motor pressure than not having a chain at all, since the bare tires tend to spin in the mud, while the skid steers with current chains sink into mud. Traction is also lost due to the open spaces. When the chains move and push the mud, the mud simply moves over the crossbars of the pads. When the machine tries to move forward in the mud, the chains whip and mix the mud, instead of effectively pushing it backward and thus creating the thrust necessary to move the machine forward. The same result can be observed while working in sand, pebble and other like materials.

It has been recognized that the origin of problem with the large open spaces in current two-wheel tire chains is in the association with the single-wheel tire chains. The single-wheel tire chains rely on the tire itself to close the open spaces within the chain. The crossbars in the single-wheel tire chains provide only for the enhanced traction, while the tire provides for the floatation. In contrast, in the skid steer two-wheel tire chains in which the contact area between and chains and the operating ground is 5 to 10 times greater, there is currently no mechanism to deal with the floatation problem and, therefore, optimal traction cannot be reached as well.

G. Drawbacks Of Current Tire Chains For Skid Steers

While tire chains have been used successfully with skid steer loaders, there are a number of drawbacks associated with such use. During operation of a skid steer with a set of tire chains, the contact surface of all pads wear down as the pads move on the operating ground. The pads eventually break or their limited traction capabilities diminish to an unusable level. The pads are the largest and most costly component of the tire chain. They are difficult and economically unsound to repair. The user has no other choice but to purchase a whole new set of chains, which often come at a considerable cost.

Another major drawback is the destructive nature of the current tire chains when used on concrete, asphalt and similar hard finished surfaces. As mentioned earlier, skid steers have become very popular machines on construction sites. This is especially true for small jobs sites in cities and residential areas where sidewalks, driveways, and asphalt are prevalent. Skid steer tire chains are heavy and difficult to handle, which makes dismantling or assembling a set of chains a time consuming venture that most users prefer to avoid. Damage to the operating ground occurs because the crossbars on each pad are constructed either of steel or cast iron. As the skid steer moves forward, the driving force delivered by the tire chain is usually greater than what the contacting surface can withstand. This causes the surface to scratch, crack or break. As a result, the current skid steer tire chains limit the operating grounds over which the machine may travel or operate, without such damaging drawbacks.

Accordingly, there is a need in the art for low ground pressure tire chains for skid steers to cope with the above-mentioned problems and inconveniences. It is to the provision of such that the present invention is directed.

SUMMARY OF THE PRESENT INVENTION

The present invention meets the need in the art by providing a tire chain for skid steers having spaced-apart pairs of wheels, in which the tire chain comprises a plurality of base units pivotally interconnected in series. Each base unit comprises of a pair of opposing ears that each have a portion extending as an interior surface at an oblique angle towards the opposing ear, whereby during operative use of the base unit, a portion of a tire is momentarily wedged in a gap between the side supports. A pair of spaced-apart transverse cross-members extends between the ears. The extending portion of the ears each defines a pair of opposing cavities between the extending portion, the ears, and respective laterally outwardly edges of the cross-members. The transverse cross-members define a bore within the respective cavities for receiving a fastener. A plate attaches to a lower surface of the cross-members with the fasteners received through the bores. The links pivotally interconnect adjacent ones of the base units, for forming an endless-loop track for disposing around a pair of opposing wheels of a skid steer.

Objects, features, and advantages of the invention will become apparent upon reading of the detailed description in conjunction with the drawings, summary, and the claims hereto.

A BRIEF INTRODUCTION OF THE INVENTION

With general reference to the drawings (described below), the present invention overcomes the limitations and restrictions of skid steer tires 14, 16 and current skid steer tire chains that occur both on slippery boggy surfaces and hard finished surfaces. As shown in FIG. 1, the track 12 and base units 24 comprising the track provide the skid steer 10 with an improved apparatus that resolves problems of floatation and traction, wear of the main chain components, and adverse effects on hard finished surfaces. In addition, the present invention stabilizes the maneuverability of skid steer loaders on slopes and enhances the overall control of the machine by the operator.

The track 12 of the present invention comprises multiple components assembled together to form tire chains 12, specifically designed for skid steers 10, but that can also be used on other construction vehicles with similar steering system. There are five main components and these are called a base 30 (FIG. 2), a shoe 52 (FIG. 2) (and in an alternate embodiment, a rubber shoe 90) (FIGS. 4, 4A, 4B and 4C), a link 26 (FIG. 3B) (pairs of links are used to pivotally connect adjacent bases to form the track) (FIG. 3A), and a pin 70 (FIG. 3C) to secure the links 26 to the bases 24.

The shoe 52 is a forged steel plate with three grousers 57, 67, which can be attached to the base member 30. The shoe 52 delivers low ground pressure and eliminates large open spaces on the track 12 increasing floatation and traction.

The rubber shoe 90 is a rubber plate with defined traction lugs or grousers 98. The skeleton of the rubber shoe 90 is composed of a forged steel core 92 that bolts on to the base member 30 and a molded rubber exterior 94. The rubber shoe 90 eliminates open spaces and prevents the track 12 from damaging hard finished surfaces. The rubber shoe 90 provides traction, floatation, and allows the skid steer 10 to cross freely over hard surfaces such as concrete or asphalt.

The base member 30 is a cast piece with two cross bars 34 and adjacent connecting ears or side supports 32. The base member 30 allows the track 12 to be properly guided on the skid steer tires 14, 16 while connecting all other components together to form a continuous chain or track. The base member 30 is specifically designed to protect the skid steer tire 14, 16 from contacting the connecting parts the links 26, the pins 70, and the shoes 52, 90 during adverse driving ground conditions. In addition, the base member 30 allows the chain 12 to be easily rebuilt. The base member 30 has a 4-bolt pattern to which the shoe 52 or rubber shoe 90 attaches. The base member 30 also has adjustment holes 44,46 or 45, 47 for connecting links 26 that allows the chain 12 to be tightened or loosened around the tires 14, 16 of the skid steer 10. The base unit 24 enables skid steers 10 using the chain 12 to selectively employ rubber shoes 90 or metal shoes 52 depending on the particular job application. It also allows for easy replacement of worn rubber shoes 90 or metal shoes 52 without the need to dispose of the rest of the chain 12, reducing the operational and maintenance costs.

The link 26 is a forged steel piece that connects subsequent base units 24 together forming the continuous chain 12. The link 26 allows the base units 24 to pivot at different angles while operating the skid steer 10 over uneven surfaces.

The pin 70 is a forged steel carriage bolt with a hole 77 made in its ending tip to where a cotter pin 79 is inserted. The pin 70 bolts through the base member 30 and the link 26 to attach them together.

DETAILED DESCRIPTION OF THE PREFERRED EMBODIMENTS

Figure 1A:
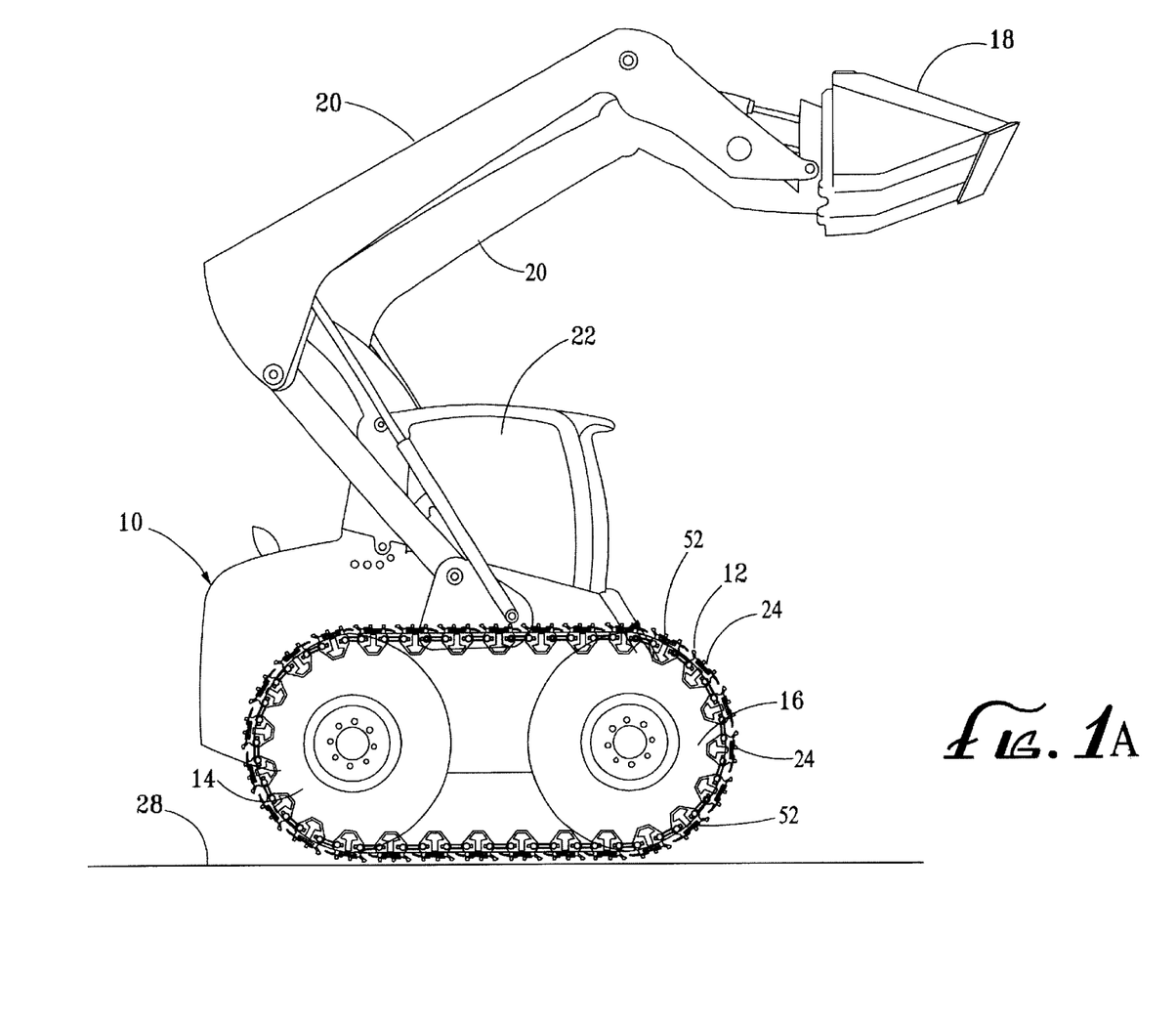
FIG. 1A is a side view of a skid steer with a chain made of base units with metal shoes, which embody principles of the present invention in a preferred form.
Figure 1B:
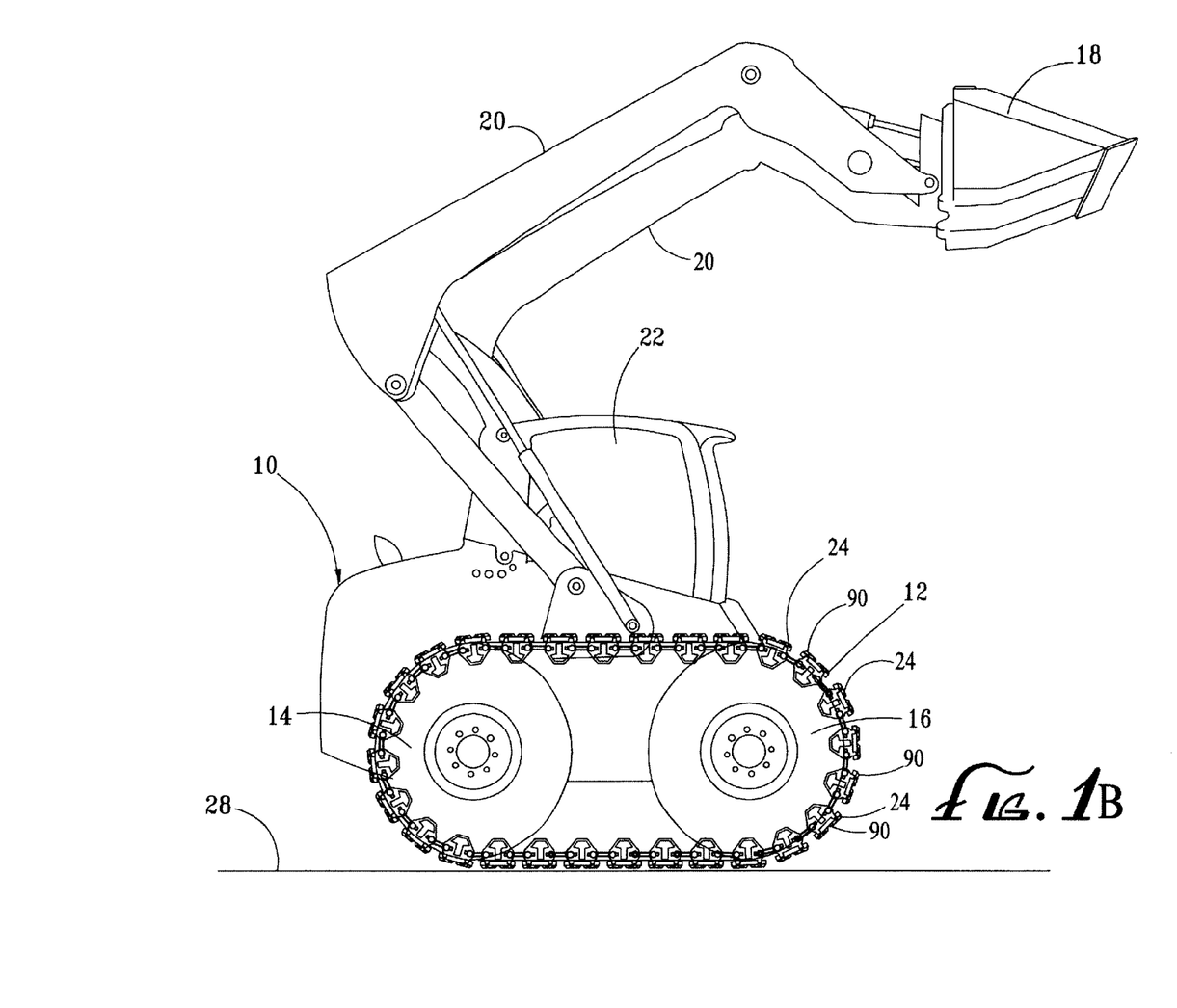
FIG. 1B is a side view of a skid steer with a chain made of base units having rubber shoes according to the present invention.

With reference next to the drawings in which like parts have like identifiers, there is shown in FIG. 1A, a skid steer 10 with a plurality of base units 24 pivotally connected together to define a chain 12 embodying principles of the invention in a preferred form. The skid steer 10 includes a pair of opposing wheels 14, 16 on opposing sides of the skid steer. The wheels 14, 16 include conventional skid steer tires. The skid steer 10 includes a bucket 18 connected to distal ends of a pair of lifting arms 20 operable from a cab 22. Each base unit 24 pivotally connects to the adjacent base unit with a pair of opposing links 26. The chain 12 supports the skid steer 10 on the operating surface or ground 28. The chain 12 distributes the weight of the skid steer loader evenly, while providing an increased contact area of the skid steer with the operating surface or ground 28. The weight of the resulting chain 12 provides the skid steer 10 additional stabilization, which is especially beneficial when the machine is traveling uphill or downhill at an angle. The weight of chain 12 further reduces vibrations and shaking that often interfere with the performance of the skid steer 10. The embodiment illustrated in FIG. 1A shows the base unit 24 with a metal shoe 52. In contrast, the alternate embodiment of the tire chain 12 shown in FIG. 1B shows the base unit 24 with a rubber shoe 90.

Figure 2:
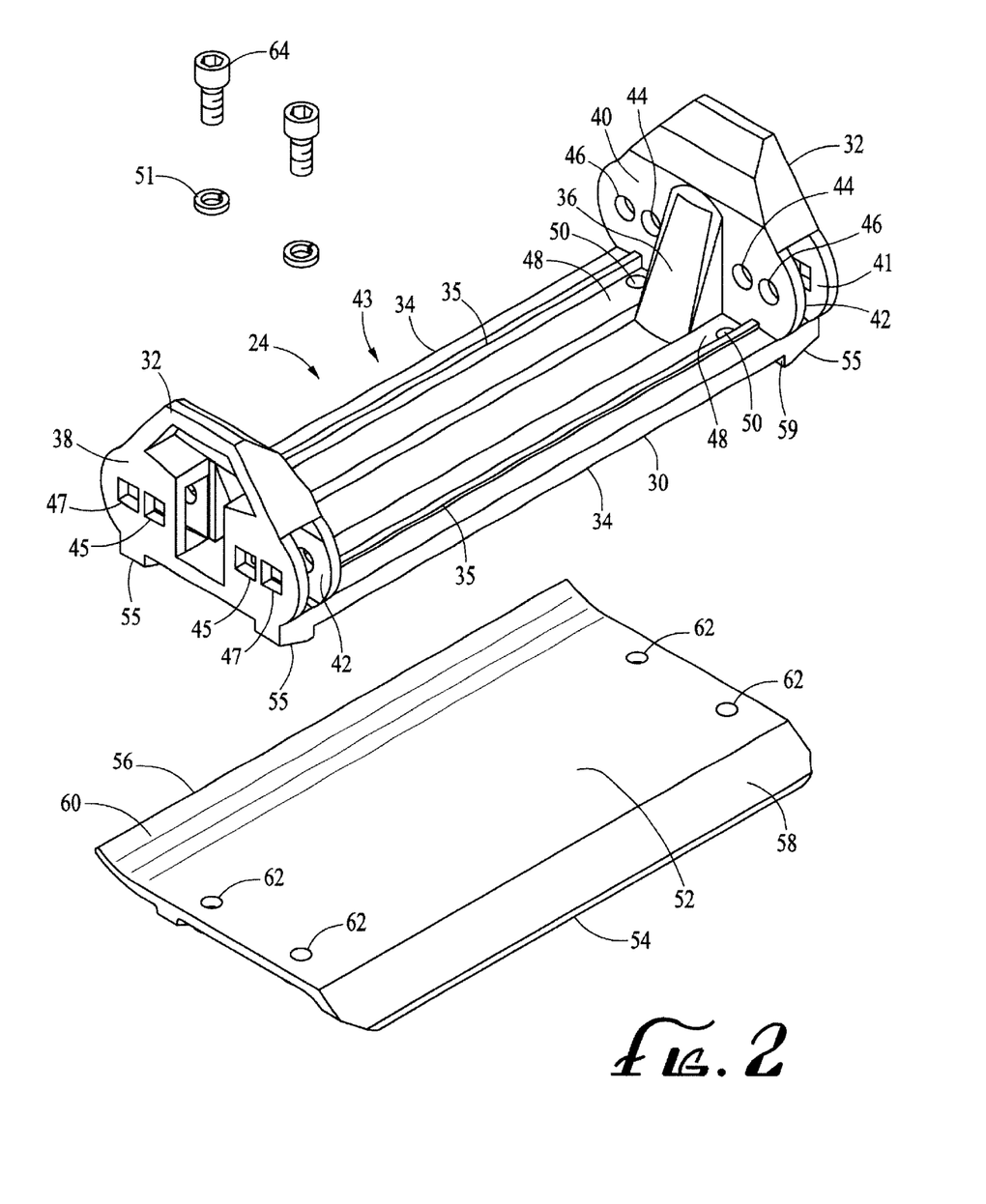
FIG. 2 is a perspective exploded view of a base unit and shoe for assembling the chain illustrated in FIG. 1A.

FIG. 2 is a perspective exploded view of a base unit 24 with a shoe 52 exploded therefrom. The base unit 24 is used with other base units in the chain 12 illustrated in FIG. 1A. The base unit 24 in FIG. 1B differs by having the rubber shoe 90, as discussed below. The base unit 24 is a cast one-piece member generally 30 having a pair of opposing upstanding ears 32. The ears 32 are interlinked by parallel opposing cross-members 34. The spaced-apart ears 32 with the cross-members 34 define a recess generally 43 which receive a portion of the tires 14, 16 during operation of the track 12 on the skid steer 10. The cross-members 34 are spaced-apart and have protruding crossmember lips 35. The lips 35 engage the tread of the tires 14, 16 during operation of the skid steer 10 with the track 12. A wedge 36 extends from an inner face 40 of the ear 32 and tapers at an oblique angle towards the opposing ear. The wider portion of the wedges 36 are towards the cross-members 34. Each ear 32 has an outer face 38 and the inner face 40. These faces 38, 40 are spaced-apart to define a gap 41 therebetween. Opposing sides of the ears 32 define elongated slots 42 for receiving links 26 into the gap 41 between the faces 38, 40, as described below. Two pairs of circular openings 44, 46 are defined on the inner face 40 of the ears 32 on opposing sides of the wedge 36. Two pairs of rectangular-shaped openings 45, 47 are defined on the outer face 38 of the ears 32 on opposing sides of the wedge 36 in alignment with circular holes 44, 46 on the inner faces 40, for a purpose discussed below.

The wedges 36 define opposing recess portions or cavities 48 between the respective wedge 36, the inner face 40 of the respective ear 32, and a laterally outward edge of the respective cross-member 34. The cross-members 34 define a bore 50 within each recess 48 of the base 30.

A shoe guide 55 depends from each of the ears 32. The shoe guides 55 in the illustrated embodiment are generally rectangular shaped projections with an outer sloping edge. An inward backside 59 opposing the sloping edge is flat and perpendicular to the cross-members 34. The shoe guides 55 are transverse to the cross-members 34.

FIG. 2 illustrates a shoe 52 exploded from the base 24. The shoe 52 is a metal plate that includes a leading edge 56 and a trailing edge 54. The trailing portion 58 of the shoe 52 is generally curved in a first direction while the leading portion 60 of the shoe 52 is generally curved in a second opposite direction. Preferably, the trailing edge 54 extends in a direction towards the surface or ground 28 on which the skid steer 10 is being operated during forward operation of the skid steer. A grouser 57 (illustrated in FIG. 3) depends from the trailing edge 54 for engaging the ground 28 during operations of the skid steer. Threaded bores 62 of the shoe 52 align with the openings 50 of the base 30. The lateral outer edges of the shoe 52 align between the shoe guides 55 before the shoe is fastened into position to the lower portion of the base member 30. In the illustrated embodiment, allen-type fasteners 64 (two of which are illustrated) extend through lock washers 51 and the openings 50 to engage the threaded bores 62 in the shoe 52. The allen-type fasteners 64 are disposed within the respective cavity 48 for rigidly connecting the shoe 52 to the base member 30.

Figures 3, 3A, 3B, 3C:
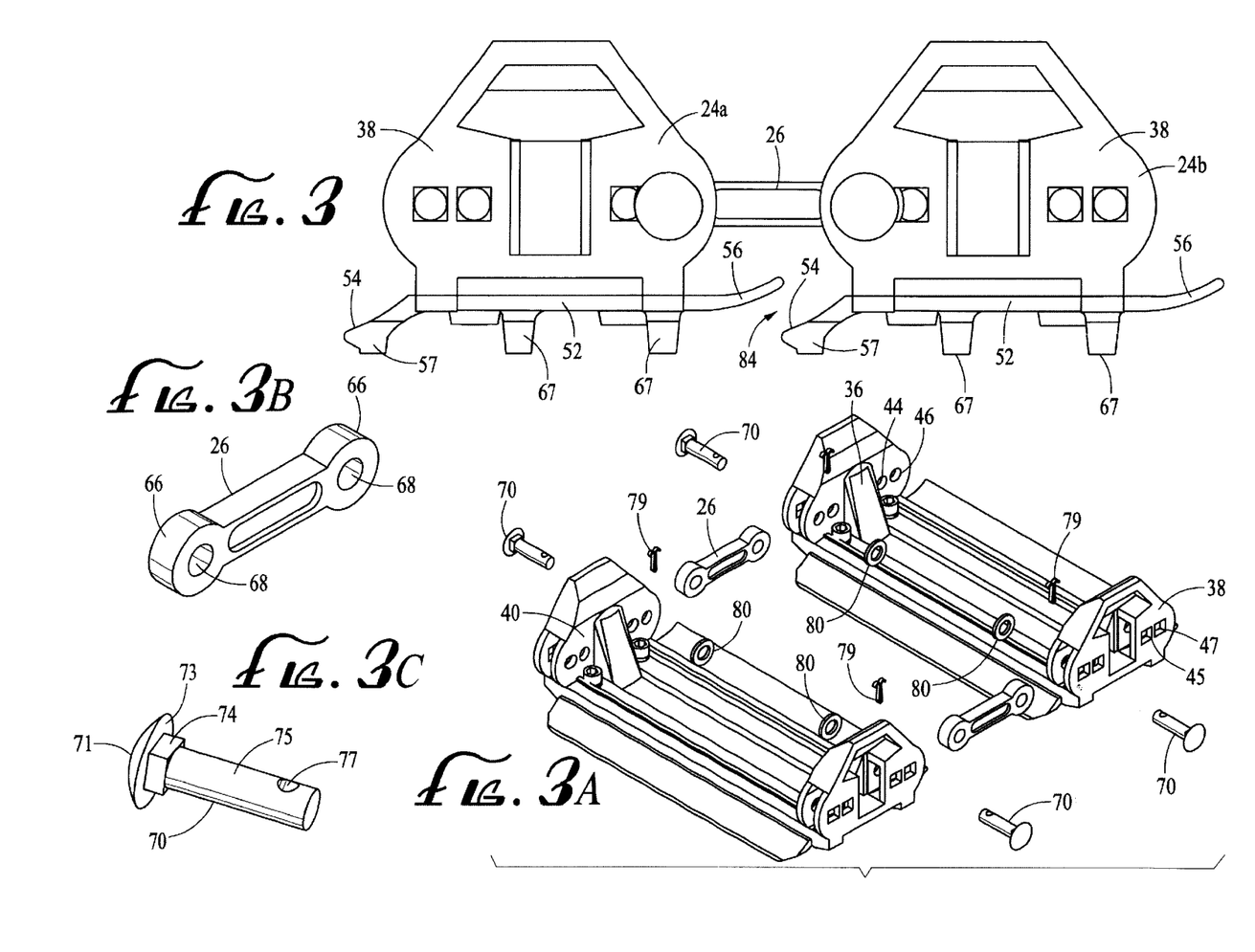
FIG. 3 is a side view of a pair of the base units illustrating the pivotal linked connection between adjacent pairs of the base units in the chain illustrated in FIG. 1A.
FIG. 3A is an exploded perspective view of the pair of base units illustrated in FIG. 3.
FIG. 3B is a perspective view of a link for interconnecting adjacent pairs of the base units as illustrated in FIGS. 3 and 3A.
FIG. 3C is a perspective view of a pin for engaging the link and the base unit illustrated in FIG. 3B and FIGS. 3 and 3A.

FIG. 3 is a side view of a pair of the base units 24, and FIG. 3A is an exploded perspective view of the pair of base units. In the illustrated embodiment, a pair of spaced-apart projecting grousers 67 extend from a bottom surface of the shoe 52. Adjacent base units 24a and 24b in the chain 12 pivotally connect with a pair of the links 26 that are received in the slots 42. As best illustrated in FIG. 3B, the link 26 is an elongate member having enlarged opposing distal ends 66 that each defines an opening 68. The distal ends 66 are received through the slots 42 of the adjacent base units 24. The openings 68 align with a selected one of the rectangular and circular openings 44, 45 (or 46, 47, selectively) in the inner and outer faces 40, 38. A pin 70 passes through the openings 44, 45 (or 46, 47) and the opening 68 to secure the link 26 to the base unit 24.

As best illustrated in FIG. 3C, the pins 70 are carriage bolt-type fasteners, having a semispherical head 71 and flat face 73 on the opposing side of the head. A rectangular flange 74 extends therefrom. The flange 74 aligns with the rectangular openings 45, 47 of the ears 32 in the base member 30. A round shaft 75 extends from the rectangular flange 74 of the pin 70 for aligning with the openings 44, 46 on the inner face 40 at the ear 32. The pins 70 pass through the openings 44, 45 (or 46, 47) and the openings 68 to secure the link 26 to the base unit 24. A round flat washer 80 is received over the shaft 75. The illustrated pin 70 defines a hole 77 in a distal end portion. The hole 77 receives a cotter pin 79 (see FIG. 3A) for securing the pin 70 in position.

As illustrated in FIG. 3, the trailing edge 54 of one shoe 52 overlaps the leading edge 56 of the shoe 52 in the adjacent base unit. This defines an overlap gap 84 between the adjacent shoes 52 of the base units 24.

Figure 5:
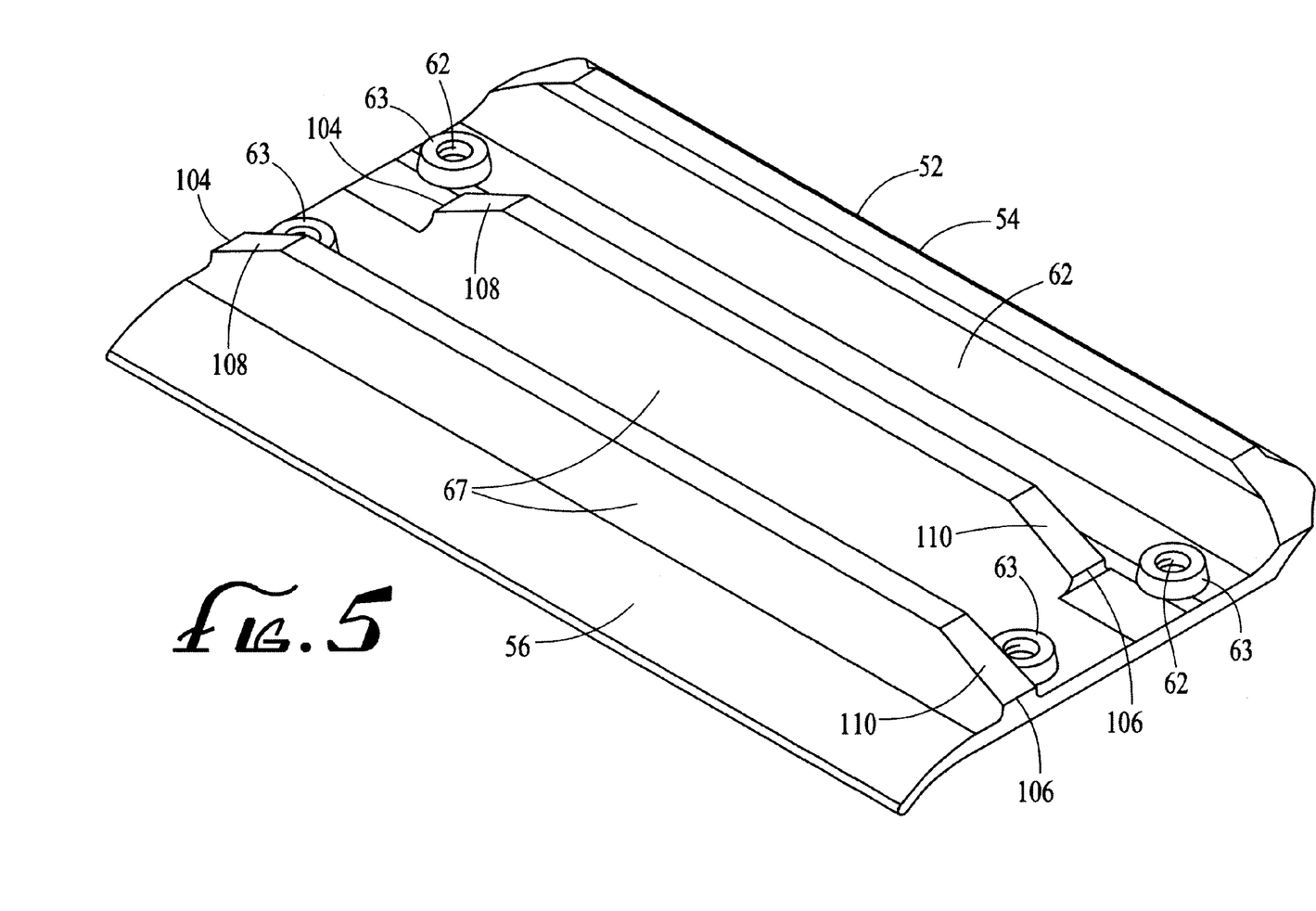
FIG. 5 is a perspective view of an exterior face of an embodiment of the shoe according to the present invention.

FIG. 5 is a bottom-up view of the shoe 52 illustrating features of the projecting grousers 67 in one embodiment. In this embodiment, the grousers 67 have opposing distal ends 104, 106 that define tapering surfaces 108, 110. These tapering surfaces 108, 110 facilitate rotation and turning of the skid steer 10. In the illustrated embodiment, the bores 62 extend through projections 63 on the bottom surface of the shoe 52.

Figures 4, 4A, 4B, 4C, 4D:
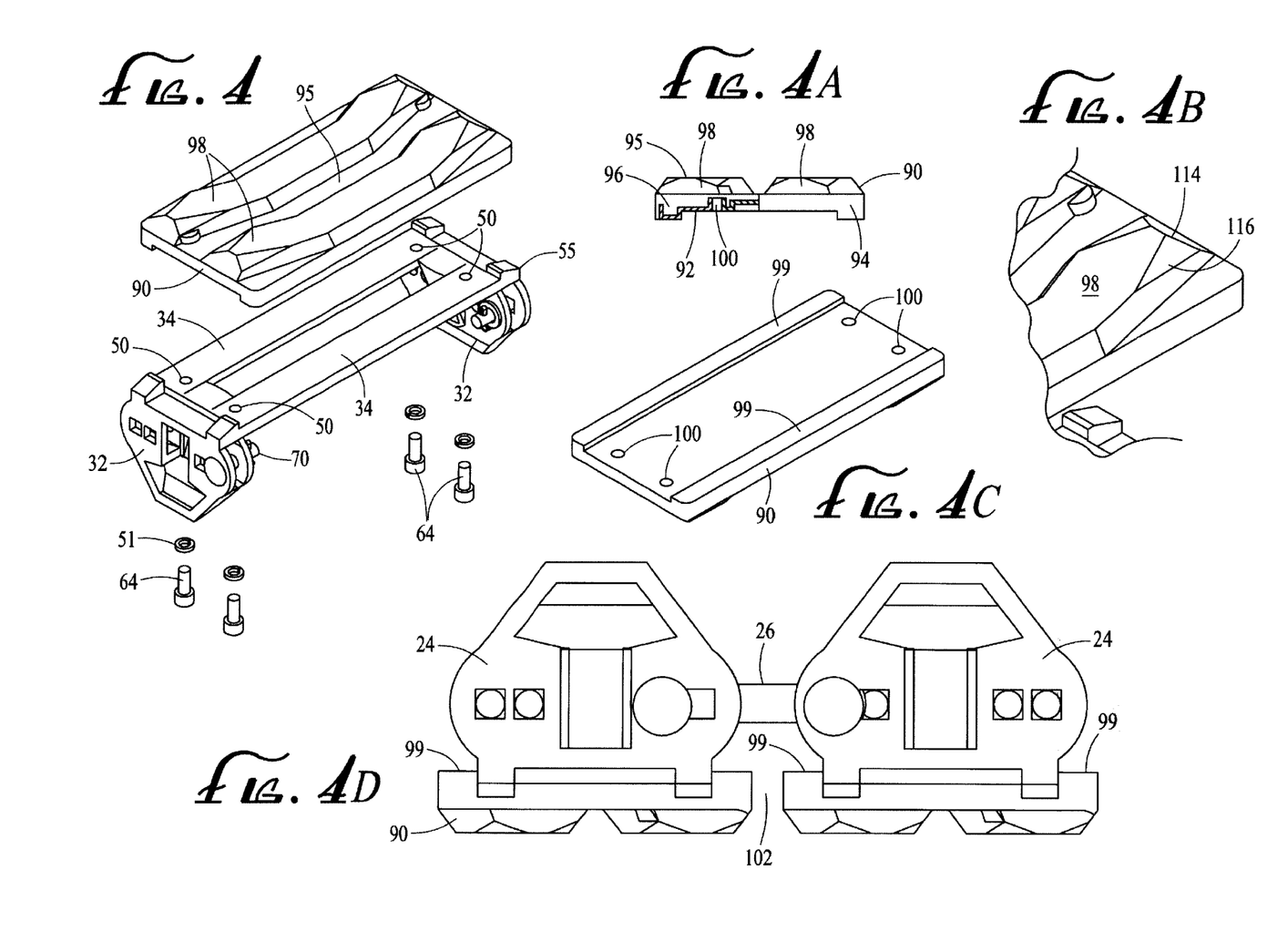
FIG. 4 is an exploded bottom view of the rubber shoe and base unit used in the chain illustrated in FIG. 1B.
FIG. 4A is a partially cut-away end view of the rubber shoe illustrated in FIG. 4 to show features of its construction.
FIG. 4B is a perspective detailed illustration of a portion of the rubber shoe illustrated in FIG. 4.
FIG. 4C is a top view of the rubber shoe illustrated in FIG. 4.
FIG. 4D is a side view illustrating the pivotal linked connection between adjacent pairs of the base units in the chain illustrated in FIG. 1B.

FIG. 4 is an exploded view of the base unit 24 illustrated in FIG. 1B equipped with a rubber shoe 90. As shown in partial cross-sectional view in FIG. 4A, the rubber shoe 90 includes a steel core 92, which is sandwiched with molded rubber 94. The rubber 94 defines an exterior wear surface 95 from which grousers 98 project. As shown in the partially cut away view, the rubber 94 is molded to the steel core 92. A plurality of spaced-apart steel core cups 96 secure the molded rubber 94 to the steel core 92. As shown in detail perspective view in FIG. 4B, the distal ends 114 and ending corners 116 of the grousers 90 are tapered to facilitate rotation and turning of the skid steer 10.

FIG. 4C illustrates a bottom view of the rubber shoe 90. The rubber shoe 90 has locking ridges 99 which align with the cross-members 34 in the base member 30. The steel core 92 defines threaded openings 100 that align with the bores 50 of the base unit 24. As shown in FIG. 4, the rubber shoe 90 is secured to the base unit with allen-type fasteners 64.

FIG. 4D illustrates a side view of a pair of base units 24 with attached rubber shoes 90. The adjacent base units 24 are joined together with a pair of opposing links 26. The leading edge of the trailing base unit 24 and the trailing edge of the adjacent base unit define a gap 102. The gap 102 allows the base units 24 to bend at different angles on the chain 12 while the skid steer 10 is moving over the ground 28. The gap 102 also allows for chain 12 adjustments.

With reference to FIGS. 1A, 2, and 3, the chain 12 is used with the skid steer 10 having opposing pairs of wheels 14, 16 for moving the loader at a construction site. The base units 24 are assembled by first connecting the shoe 52 or rubber shoe 90 to the base member 30. This is accomplished by aligning the shoe 52 (or the rubber shoe 90) with the bottom of the base member 30 against the shoe guides 55. Then the allen-type fasteners 64 extend through lock washers 51, the aligned holes 50 in the cross-members 34 of the base member 30, and engage the threaded holes 62 in the shoe 52 (or threaded holes 100 in the rubber shoe 90). The heads of the allen-type fasteners 64 are received in the recesses 48. These types of fasteners are preferable over nuts that wear on the outside surfaces due to sand, dirt, pebbles, that round the edges which make the nuts difficult to remove for repair or replacement of the track and the shoes. Moreover, the holes 50 are located on opposite ends of each cross-member 34 strengthening the support of the allen-type fasteners 64 to the shoe 52 or rubber shoe 90. The threaded holes 62 and 100 eliminate the need for fasteners on the wear surface of either the shoe 52 or rubber shoe 90. It is to be appreciated that the allen-type fastener 64 has an enclosed tool bed, which sustains exterior wear, yet and allows the allen-type fastener 64 to be easily removed if necessary. The compact size of the allen-type fastener 64 allows it to fit within the recess 48 and thereby avoid contact with the tire 14, 16, during operation of the skid steer 10 with the chain 12.

With reference to FIGS. 1A, 3 and 4D, the base units 24 are then assembled into the chain 12. This is accomplished by connecting adjacent base units 24 with the opposing pairs of links 26. One of the links 26 inserts through one of the slots 42 in the ear 32 of one of the base units 24. The link 26 is fastened thereto by passing the pin 70 into the hole 44, 45 (or 46, 47, selectively), depending on the spacing desired between adjacent base units 24. The rectangular flange 74 of the pin 70 conforms to the square-shape of the holes 45, 47 and prevents the pin 70 from turning.

With the pin 70 locked in position, two sides of the pin 70 will receive most of the wear during operation. After sustaining substantial wear from operation of the chain 12, the pin 70 can be repositioned 90 degrees from its original position within the holes 45, 47 for additional usage. The shaft of the pin 70 passes through the opening 68 in the link 26 and a flat washer 80 touching against the inner face 40 of the ear 32. The cotter pin 79 extends through the hole 77. The free ends of the cotter pin 79 fold back to secure the pin 70 to the link 26 and to the base unit 24. The cotter pin 79 prevents the pin 70 from dislodging. Moreover, the cotter pin 79 is able to sustain heavy vibration unlike threaded nuts that might otherwise be shaken off or worn down during operation of the skid steer 10. The distal end of the pin 70, flat washer 80, and the folded cotter pin 79 lie within the recess 48. The pin 70 is positioned flat against the outer wall 38 with its concave head 71 facing outwardly away from the base 24. In this position, the head 71 of the pin 70 will accept wear or blows from contacting the ground 28 during operation. This position prevents the pin 70 fastener from becoming damaged or dislodged when making contact with the ground 28. The cavity 48 provides a sheltered location where all connection points lie. The recess 48 allows all connecting parts 70, 80, 79, 64, and 51 to act freely from contact or wear by the tires 14, 16, thereby preventing wear on both the adjoining parts and the tires.

The chain 12 is then wrapped over the spaced-apart tires 14, 16 of the skid steer 10, and the opposing distal ends of the chain 12 secured with the links 26 as discussed above. Portions of the tires 14, 16 become wedged in the recess 43 defined by the opposing ears 32 and the wedge-shaped extending surfaces 36, during operation of the track 12. With reference to FIGS. 1, 2, and 3, the tires are resilient, and so are engagingly contacted by the cross-member lips 53, which prevent the tires from slipping over the cross-members 34 and into the cavity 48 between the opposing extending surfaces 36.

During operation of the skid steer 10, the chain 12 rotates in response to rotation of the drive wheels 14, 16. The tires engage and release from the recesses 43 in the base units 24 in sequence as the chain 12 moves. This facilitates the tires retaining the chain 12 in line. Further, the extending surfaces 36 restrict the tires from entering the recesses 48, and thereby keeping the tires away from the fasteners 64, lock washers 51, pin 70, flat washers 80, and cotter pin 79.

The trailing edge 54 of the shoe 52, together with the grousers 57, 67, dig into the ground as the tires 14, 16 rotate, thereby providing traction for moving the skid steer 10 across the ground 28. The tapered distal ends 104, 106 of the shoe 52 facilitate the rotation and turning of the skid steer 10 by allowing the shoes 52 to slide freely in parallel direction to the grousers 67 when turning. The tapered surfaces 108, and 110 prevent the shoe 52 from sticking to the ground 28 when sliding side-ways during a turn of the skid steer 10. The trailing edge 54 of the shoe 52 on the leading base unit 24 overlaps the leading edge 56 of the shoe 52 of the following adjacent base unit 24 on the chain 12. The gap 84 is narrow and close, and allows the chain 12 to rotate around the diameter of the wheels 14, 16, as illustrated in FIG. 1A. The overlapping leading and trailing portions of the shoes 52 lock together and the gap 84 closes by upward pressure of the ground materials and restricts significant amounts of mud, sand, and the like from passing between the chain 12.

Further, the shoe 52, secured by the four fasteners 64 distributes the loading across the base member 30 and the cross-members 34. The overlapping shoes 52 restrict the passage of mud, sand, and the like into the chain 12 and the space between opposing tires 14, 16. The substantially closed chain 12 accordingly provides floatation for the skid steer 10 as it travels, turns, and scoops in mud, sand, and other soft ground, to provide improved traction while reducing the tendency of the skid steer compact loader to sink during operations.

The grousers 57, 67, the trailing edge 54, and the bottom surface of the shoe 52, define wear surfaces for the chain 12. The shoe 52 is readily replaceable. The fasteners 64 are removed from the worn or broken shoes 52 and the shoes are readily and easily replaced.

In the alternate embodiment illustrated in FIG. 4, the rubber shoe 90 provides a resilient surface for operating the loader 10 on finished surfaces such as roadways, sidewalks, and the like, without damage. The rubber shoe 90 is readily installed, as discussed above, with the fasteners 64. The rubber grousers 98 dig into the ground as the wheels rotate, thereby providing traction for moving the skid steer 10 across the ground 28. The tapered distal ends and corners 114, 116 facilitate rotation and turning of the skid steer 10 by allowing the rubber shoe to slide freely in parallel direction to the grousers 98 when turning. The tapered surfaces 114 and 116 prevent the shoe 90 from sticking to the ground 28 when sliding side-ways during a turn of the skid steer 10. The narrow gap 102 between rubber shoes 90 restrict the passage of mud, sand, and the like into the chain 12 and the space between opposing tires 14, 16. The substantially closed chain 12 provides floatation for the skid steer 10 as it travels, turns, and scoops in mud, sand, and other soft ground, to provide improved traction while reducing the tendency of such compact loaders to sink during operations.

With reference to FIG. 2, the shoe guides 55 allow either the rubber shoe 90 or shoes 52 to be positioned properly before being fastened to the base member 30. In addition, shoe guides 55 reinforce and secure the shoe 52 or rubber shoe 90 during operation of the skid steer 10. The locking ridges 99 of the rubber shoe 50 facilitate aligning the rubber shoe with the cross-members 34.

The present invention of an base unit 24 and chain 12 overcomes the limitations and drawbacks found in skid steer loaders and tire chains with improved performance and use of tire chains 12. First, the large open space between the tires 14, 16 no longer fills with debris, which if permitted to seep or rise up can cause the machine to sink quickly. This enables the skid steer to have lower ground pressure with increased floatation. Second, traction is increased because the added floatation allows the skid steer to operate above the boggy surface. Thus, the tire chain 12 provides the skid steer with better and more effective contact with the operating surface or ground. Third, the rubber shoe enables the skid steers to travel freely over hard finished surfaces without causing damage. Fourth, the 4-bolt attachment system allows users to choose selectively between shoe 52 and rubber shoe 90, depending on the particular requirements and limitations of the work to be accomplished. Fifth, worn shoes 52, rubber shoes 90, or damaged parts, can be replaced easily eliminating the need to purchase an entirely new set of tire chains. The base 24, which is the most complicated and expensive component of the chain 12, makes virtually no contact with the operating ground and is thus protected from wear. Sixth, the tapered distal ends and corners of both shoe 52 and rubber shoes 90 facilitate rotation and turning of the skid steer 10. Seventh, the weight of the base unites 24 provides the skid steer 10 with additional and improved operational stabilization.

The base units 24 and the chain 12 assembled with a plurality of such units meets the need in the art by overcoming the limitations and drawbacks associated with the current tires and tire chains for skid steers. While the present invention has been described in detail with particular references to the preferred embodiments thereof, it should be understood that many modifications, additions and deletions, in addition to those expressly recited, may be made thereto without departure from the spirit and scope of the invention as set forth in the claims.

What is claimed is:

1. A base unit for assembly with a plurality of pivotally interconnected ones of said base unit to form an endless track for small loaders, comprising:

a pair of opposing side supports, each having a portion extending as an interior surface at an oblique angle towards the opposing side support, whereby during operative use of the base unit a portion of a tire is momentarily wedgingly received in a gap between the opposing side supports a pair of spaced-apart transverse cross members attached at opposing ends to the side supports;

the extending portion of the side supports each defining a pair of opposing cavities between the extending portion, the side support, and respective laterally outward edges of the cross-members, and the transverse cross members defining a bore within the respective cavities for receiving a fastener therethough; and a plate attached with fasteners to a lower surface of the cross members with the fasteners received in the bores.

2. The base unit as recited in claim 1, wherein the bores are substantially entirely within a space between the side supports and a line parallel to a longitudinal axis of the base unit at an extent of the extending portion of the side supports at a junction thereof with the cross members.

3. The base unit as recited in claim 1, wherein the opposing side supports each comprise:

a pair of spaced-apart flanges that define a gap therebetween for receiving a member to connect one base unit to an adjacent base unit;

the flanges defining aligned openings for receiving a fastener therethrough to connect the member to the side support; and a central member extending from an interior one of the flanges and disposed at an angle, so that the central member tapers from a first distal extent towards the opposing side support to a second distal extent at the cross members.

4. The base unit as recited in claim 3, wherein the central member defines opposing recesses between a side face of the central member and an interior face of the flange, and the cross-members define a bore within each of the recesses for receiving fasteners that secure the plate to the cross members.

5. The base unit as recited in claim 4, wherein the plate defines threaded openings for engaging a threaded fastener that passes through the bores to the plate.

6. The base unit as recited in claim 4, wherein each plate has an arcuate leading edge portion extending in a first direction of the side supports and an arcuate trailing edge portion extending in a second opposing direction of the side supports, whereby the trailing edge of one base unit overlaps the leading edge of an adjacent base unit in the track, the leading edge portion is disposed at in first arc relative to a central portion of the plate.

7. The base unit as recited in claim 6, wherein the trailing edge portion is disposed at a second arc relative to the central portion of the plate.

8. The base unit as recited in claim 7, wherein the second arc is greater than the first arc.

9. The base unit as recited in claim 3, wherein the aligned openings in the flanges are of a first cross-sectional shape in a first one of the pair of flanges and a second different cross-sectional shape in the other of the pair of flanges.

10. The base unit as recited in claim 9, wherein the first cross-sectional shape is rectangular and the second cross-sectional shape is circular.

11. The base unit as recited in claim 1, wherein the fastener comprises a carriage bolt having an concave head disposed outwardly of the outward flange and a fastener engaged on an interior side of the flange, the bolt passing through the opening in the member, whereby the member is pivotally connected to the track.

12. The base unit as recited in claim 10, wherein the opening in at least one flange is keyed for disposing a carriage bolt in a selected orientation, to provide a leading face which receives wear during use of the base unit with other such base units in an endless track.

13. The base unit as recited in claim 1, wherein the plate comprises a composite assembly of a rigid metal plate sandwiched by a resilient jacket having projecting teeth from a lower surface.

14. The base unit as recited in claim 13, wherein the metal plate defines a plurality of spaced-apart cups for securing the resilient jacket thereto.

15. The base unit as recited in claim 13, wherein the plate defines a locking ridge on opposing sides for aligning the plate to the cross-members.

16. The base unit as recited in claim 1, further comprising opposing pairs of guides depending from a bottom surface of the side supports, for holding the shoe in position to the base unit.

17. The base unit as recited in claim 1, wherein the cross-members define raised lips extending in a first direction, whereby the lips engage a tire of a skid steer for facilitating travel of the base unit relative to the tire.

18. The base unit as recited in claim 1, wherein the plate defines threaded holes that align with the bores in the recesses for receiving the fasteners.

19. The base unit as recited in claim 18, wherein a bottom portion of the plate defines extending projections that define the threaded holes, for extending the fasteners within the plate sufficiently to secure the plate to the cross-members.

20. The base unit as recited in claim 1, wherein each plate has at least one grouser extending outwardly therefrom.

21. A track for small loaders having spaced-apart pairs of wheels, comprising a plurality of the base units as recited in claim 1 with adjacent base units pivotally interconnected in series by a pair of links.

22. A track for small loaders having spaced-apart pairs of wheels, comprising:

a plurality of base units pivotally interconnected in series, each base unit comprising:

a pair of opposing side supports, each having a portion extending as an interior surface at an oblique angle towards the opposing side support, whereby during operative use of the base unit a portion of a tire is momentarily wedgingly received in a gap between the opposing side supports;

a pair of spaced-apart transverse cross members attached at opposing ends to the side supports;

the extending portion of the side supports each defining a pair of opposing cavities between the extending portion, the side support, and respective laterally outward edges of the cross-members, and the transverse cross members defining a bore within the respective cavities for receiving a fastener therethough; and a plate attached with fasteners to a lower surface of the cross members with the fasteners received in the bores; and link members for pivotally interconnecting adjacent ones of the base units, for forming an endless-loop track for disposing around a pair of opposing wheels of a loader.

23. The track as recited in claim 22, wherein the bores are substantially entirely within a space between the side supports and a line parallel to a longitudinal axis of the base unit at an extent of the extending portion of the side supports at a junction thereof with the cross members.

24. The track as recited in claim 23, wherein the opposing side supports each comprise:

a pair of spaced-apart flanges that define a gap therebetween for receiving a member to connect one base unit to an adjacent base unit;

the flanges defining aligned openings for receiving a fastener therethrough to connect the member to the side support; and a central member extending from an interior one of the flanges and disposed at an angle, so that the central member tapers from a first distal extent towards the opposing side support to a second distal extent at the cross members.

25. The track as recited in claim 24, wherein the central member defines opposing recesses between a side face of the central member and an interior face of the flange for receiving fasteners that secure a plate to the cross members.

26. The track as recited in claim 25, wherein the plate defines threaded openings for engaging a threaded fastener that passes through the bores to the plate.

27. The track as recited in claim 25, wherein each plate has at least one grouser extending outwardly therefrom, an arcuate leading edge portion extending in a first direction of the side supports and an arcuate trailing edge portion extending in a second opposing direction of the side supports, whereby the trailing edge of one base unit overlaps the leading edge of an adjacent base unit in the track, the leading edge portion is disposed at a first arc relative to a central portion of the plate.

28. The track as recited in claim 27, wherein the trailing edge portion is disposed at a second arc relative to the central portion of the plate.

29. The track as recited in claim 28, wherein the second arc is greater than the first arc.

30. The track as recited in claim 22, wherein the fastener comprises a carriage bolt having an concave head disposed outwardly of the outward flange and a nut threadingly engaged on an interior side of the flange, the bolt passing through the opening in the member, whereby the member is pivotally connected to the track.

31. The track as recited in claim 22, wherein the opening in at least one flange is keyed for disposing a carriage bolt in a selected orientation, to provide a leading face which receives wear during use of the base unit with other such base units in an endless track.

32. The track as recited in claim 22, wherein the plate comprises a composite assembly of a rigid metal plate sandwiched by a resilient jacket having projecting teeth from a lower surface.

33. The track as recited in claim 32, wherein the metal plate defines a plurality of spaced-apart cups for securing the resilient jacket thereto.

34. The track as recited in claim 22, wherein the plate defines a locking ridge on opposing sides for aligning the plate to the cross-members.

35. The track as recited in claim 22, further comprising opposing pairs of guides depending from a bottom surface of the side supports, for holding the shoe in position to the base unit.

36. The track as recited in claim 22, wherein the cross-members define raised lips extending in a first direction, whereby the lips engage a tire of a skid steer for facilitating travel of the base unit relative to the tire.

37. The track as recited in claim 22, wherein the plate defines threaded holes that align with the bores in the recesses for receiving the fasteners.

38. The track as recited in claim 22, wherein a bottom portion of the plate defines extending projections that define the threaded holes, for extending the fasteners within the plate sufficiently to secure the plate to the cross-members.

* * * * *